(12) United States Patent
Endo et al.

(10) Patent No.: US 6,771,403 B1
(45) Date of Patent: Aug. 3, 2004

(54) IMAGE DISPLAY APPARATUS (75) Inventors: Takeshi Endo, Osaka (JP); Ichiro Kasai, Toyonaka (JP); Takashi Morimoto, Suita (JP); Tetsuya Noda, Tenri (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/422,249

(22) Filed: Apr. 24, 2003

(30) Foreign Application Priority Data

Jan. 22, 2003 (JP) ........................................ 2003-013451

(51) Int. Cl.$^7$ ................................................. G02B 5/32
(52) U.S. Cl. .......................................... 359/13; 359/15
(58) Field of Search ............................. 359/13, 14, 15; 345/7, 8, 9

(56) References Cited

U.S. PATENT DOCUMENTS

| | | | | |
|---|---|---|---|---|
| 4,655,540 A | | 4/1987 | Wood et al. ................... 359/13 |
| 5,187,597 A | * | 2/1993 | Kato et al. ..................... 359/22 |
| 5,357,372 A | * | 10/1994 | Chen et al. ................... 359/637 |
| 5,379,133 A | * | 1/1995 | Kirk ............................... 359/15 |
| 5,453,877 A | | 9/1995 | Gerbe et al. ................. 359/633 |
| 5,699,194 A | | 12/1997 | Takahashi .................... 359/633 |
| 5,701,132 A | * | 12/1997 | Kollin et al. .................. 345/8 |
| 5,790,311 A | | 8/1998 | Togino ........................ 359/630 |
| 6,094,241 A | | 7/2000 | Yamazaki .................... 349/11 |

FOREIGN PATENT DOCUMENTS

| | | | |
|---|---|---|---|
| JP | 07-101267 A | * | 4/1995 |
| JP | 09-185009 A | | 7/1997 |
| JP | 2002-277822 A | * | 9/2002 |

* cited by examiner

Primary Examiner—John Juba, Jr.
(74) Attorney, Agent, or Firm—Sidley Austin Brown & Wood LLP (57) ABSTRACT

A holographic element is a reflective holographic element formed on a substrate and constituted by a composite hologram having a plurality of patterns of interference fringes composed of interference fringes nonparallel to the substrate. The holographic element forms, out of image light having a predetermined wavelength width emanating from an image display element, a plurality of observation pupils at spatially different locations, and acts in such a way as to fulfill prescribed conditions for an identical incident ray over the entire area in which the image light is incident on the holographic element.

15 Claims, 7 Drawing Sheets

IMAGE DISPLAY APPARATUS

This application is based-on Japanese Patent Application No. 2003-013451 filed on Jan. 22, 2003, the contents of which are hereby incorporated by reference.

BACKGROUND OF THE INVENTION

1. Field of the Invention

The present invention relates to an image display apparatus, more particularly to an image display apparatus such as an HMD (head-mounted display) or HUD (head-up display) that projects a two-dimensional image formed, for example, on a liquid crystal display (LCD) onto an observer's eye by the use of a holographic optical element (HOE) so as to permit the observer to observe the image on a see-through basis.

2. Description of the Prior Art

Figure 14A:
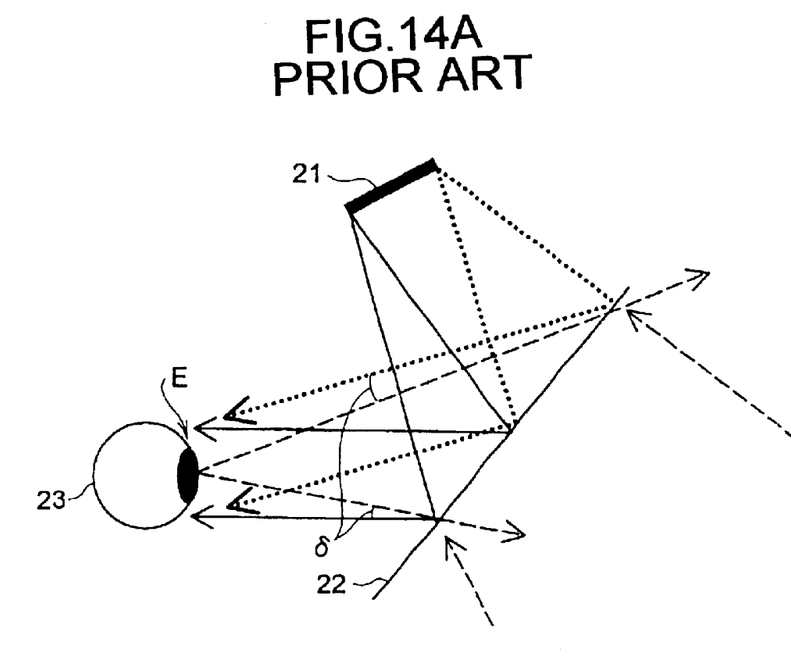
FIGS. 14A and 14B are diagrams showing an outline of the optical construction of a conventional image display apparatus.
Figure 14B:
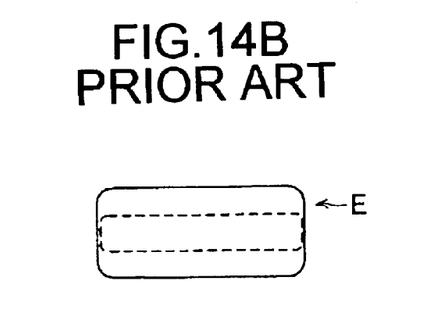

Japanese Patent Application Laid-Open No. H9-185009, U.S. Pat. No. 4,655,540, and other publications propose image display apparatuses of a see-through type that superimpose an image of an object on an image of the outside world by the use of a combiner realized with a hologram and then projects the resulting image for display. Among these, Japanese Patent Application Laid-Open No. H9-185009 proposes: an image display apparatus in the shape of eyeglasses that permits observation of a two-dimensional image on a see-through basis by the use of a holographic optical element having the function of an eyepiece lens. FIGS. 14A and 14B show an outline of the optical construction of such an image display apparatus. In FIG. 14A, broken lines represent the rays to which a holographic optical element 22 is exposed when it is fabricated, and solid and dotted lines represent the most off-axial rays of the beam representing the reconstructed image when the displayed image is observed.

The holographic optical element 22 is fabricated by the use of a high-coherence light source such as a laser light source. The holographic optical element 22 is fabricated by making a divergent beam emanating from where the observation pupil E is located interfere with a nonaxisymmetric beam with a complicated wavefront and recording the resulting interference fringes as a pattern of refractive index modulation on a photosensitive material. The holographic optical element 22 thus obtained is a volume-phase reflective hologram with good see-through characteristics and high light-use efficiency. This holographic optical element 22 has a phase function that converts the wavefront of incident light in such a way that the light is reflected by diffraction in a desired direction, and also functions as a nonaxisymmetric lens, contributing to miniaturization. When an image is observed, the holographic optical element 22 is reconstructed by the use of a light source such as an LED (light-emitting diode), in particular a light source of which the peak wavelength is roughly equal to the wavelength of the exposure rays (with a difference in wavelength of 20 nm or less). When an image display element 21 is illuminated with the light from such a light source, the image light emanating from the image display element 21 is incident on the holographic optical element 22, and the light reflected by diffraction it exerts is directed to an observer's eye 23.

The holographic optical element 22 has narrow angle selectivity, and therefore, when it is exposed and reconstructed in the manners described above, its diffraction efficiency is highest when the directions of the reconstruction rays (the solid and dotted lines) are close to those of the exposure rays (broken lines), and is low when the directions of the reconstruction and exposure rays differ. Thus, the uppermost rays represented by the dotted lines and the lower most rays represented by the solid lines come to have a large angle difference δ relative to the exposure rays represented by the broken lines. When photopolymer, a common photosensitive material, is used, the resulting refractive index modulation (in the vicinity of Δn=0.1) gives the holographic optical element sharp angle selectivity in terms of diffraction efficiency η. This makes it impossible to obtain an observation pupil E having the designed size. In FIG. 14B, the designed observation pupil E is indicated with solid lines, and the actually obtained observation pupil E is indicated with broken lines. When photopolymer is used, the observation pupil E measures, for example, 10 to 20 mm in the width direction and 1 mm (the broken lines) or 3 to 5 mm (solid lines) in the height direction. As a result, the displayed image goes out of sight when the observer moves his or her eye 23 up or down even a little. Using a photosensitive material such as silver halide or bichromated gelatin instead of photopolymer results in larger values of Δn and η, and thus helps obtain broader angle selectivity. This, however, increases fabrication costs and leads to lower durability under the influence of moisture absorption and temperature variation.

SUMMARY OF THE INVENTION

An object of the present invention is to provide an inexpensive image display apparatus that forms an observation pupil that permits easy observation of the displayed image.

To achieve the above object, according to one aspect of the present invention, a holographic element is a reflective holographic element formed on a substrate and composed of a composite hologram having a plurality of patterns of interference fringes composed of interference fringes nonparallel to the substrate. This holographic element forms, out of image light having a predetermined wavelength width emanating from an image display element, a plurality of observation pupils at spatially different locations, and acts sin such a way as to fulfill conditional formulae (I) and (II) below for an identical incident ray over the entire area in which the image light is incident on the holographic element:

$$\Delta\theta < 2 \tag{I}$$

$$\Delta\eta > 50 \tag{II}$$

where

Δθ represents the difference (°) in angle of diffraction among the different patterns of interference fringes; and Δη represents the difference (%) in diffraction efficiency among the different patterns of interference fringes.

According to another aspect of the present invention, an image display apparatus is provided with an image display element for displaying a two-dimensional image, an enlargement optical system for projecting, with enlargement, the image displayed on the image display element, and a holographic element as described above included in the enlargement optical system.

According to still another aspect of the present invention, an image display apparatus is provided with an image display element for displaying a two-dimensional image, an enlargement optical system for reflecting, as a first image, the image displayed on the image display element so as to project, with enlargement, the first image onto an observer's pupil while transmitting, as a second image, an image from an outside world so as to direct the second image to the observer's pupil, and a holographic element as described above included in the enlargement optical system

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
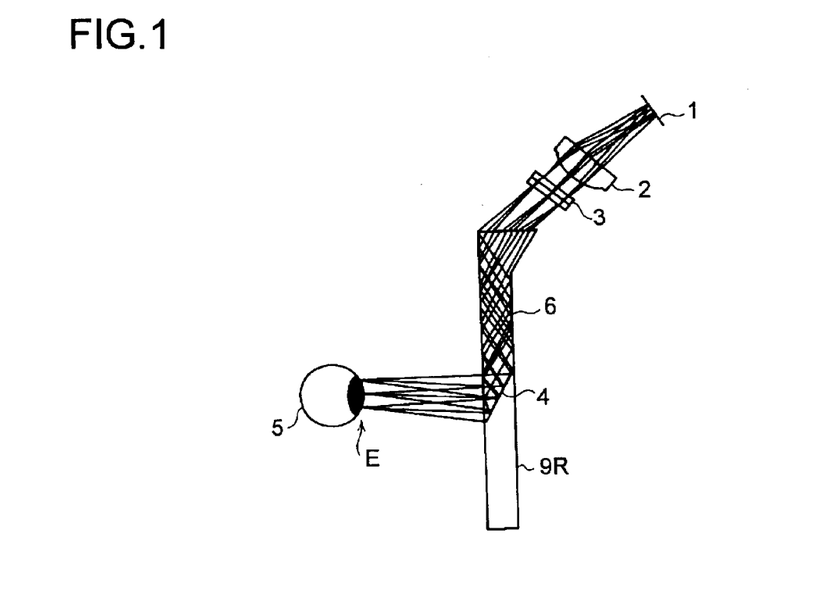
FIG. 1 is a sectional view showing an outline of the optical construction of an image display apparatus embodying the invention.
Figure 2:
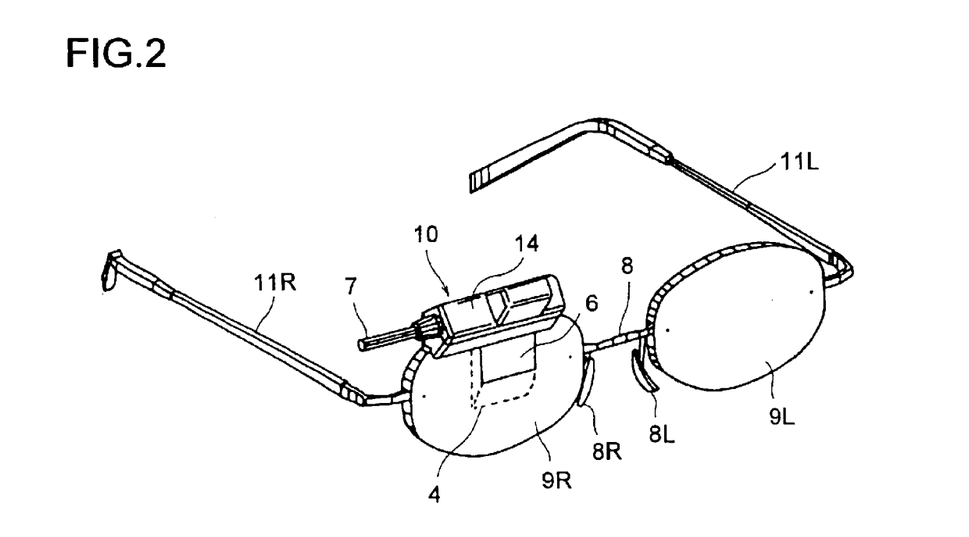
FIG. 2 is a perspective view showing the external appearance of the image display apparatus embodying the invention.

Hereinafter, an image display apparatus embodying the invention will be described with reference to the drawings. FIG. 1 shows an outline of an image display apparatus, in the shape of eyeglasses, embodying the invention, as seen in an optical section, and FIG. 2 shows its external appearance. In FIG. 1, reference numeral 1 represents an LED, reference numeral 2 represents a condenser lens reference numeral 3 represents a transmissive LCD reference numeral 4 represents a holographic optical element composed of a volume-phase reflective hologram (corresponding to an enlargement optical system constituting part of an eyepiece optical system), reference numeral 5 represents an observer's eye 5, reference numeral 6 represents a prism, and reference symbol E represents an observation pupil. In FIG. 2, reference numeral 7 represents a cable, reference numeral 8 represents a bridge, reference numerals 8R and 8L represent nose pads, reference numerals 9R and 9L represent lenses, reference numeral 10 represents a display portion, reference numerals 11R and 11L represent temples serving as a holding member that holds the image display apparatus on the observer's head, and reference numeral 14 represents a casing.

The LED 1 is an illumination light source that emits illumination light for illuminating the display surface of the LCD 3, and the condenser lens 2 is a collimator lens for illumination that makes the light from the LED 1 into a parallel beam. The LCD 3 is a transmissive spatial modulation element that forms a two-dimensional image on its display surface. Since this LCD 3 is an image display element of the type that does not emit light by itself, the two-dimensional image formed on it becomes visible when its display surface is illuminated with the illumination light from the LED 1. The image display element does not necessarily have to be a transmissive spatial modulation element, but may be a reflective spatial modulation element. For example, a reflective LCD that operates fast permits color display on a time-division basis, and is therefore suitable to achieve high-resolution color display at low costs. Here, using the LED 1 as the illumination light source and the LCD 3 as the image display element is preferable to realize a compact, light-weight, and inexpensive optical construction. However, it is also possible to use instead an image display element of the self-illuminating type such as an EL (electroluminescence) element. Using a selfilluminating image display element eliminates the need for an illumination light source and a condenser lens, and thus helps realize a more light-weight, compact optical construction.

As described above, the LED 1, the condenser lens 2, and the LCD; 3 together constitute an image forming means for forming a two-dimensional image. The image light emanating therefrom is directed to the observer's eye 5 by an eyepiece optical system constituted by the prism 6 and the reflective holographic optical element 4. As a result, the two-dimensional image is projected onto the observer's eye 5 on a see-through basis and with enlargement by the holographic optical element 4 so as to be observed as a virtual image by the observer. As shown in FIG. 2, the prism 6 is embedded as part of the right-eye lens 9R, and the display portion 10 for forming an image is fitted above the prism 6. The display portion 10 receives electric power and signals by way of the cable 7 connected thereto. The display portion 10 is housed in the casing 14, which is so fitted as to sandwich the prism 6. The LED 1, the condenser lens 2, and the LCD 3 described above are, together with other components, housed in the casing 14. With this construction, it is possible to realize a lightweight, compact image display apparatus. In the embodiment shown in FIG. 2, an image is displayed for one eye only. It is also possible, however, to apply the same construction not only to the right-eye lens but also to the left-eye lens so that an image is displayed for both eyes. Displaying an image for both eyes helps alleviate the eye strain that the observer feels as a result of being forced to observe an image with one eye.

The holographic optical element 4 is so arranged as to be sandwiched between the prism 6 and the lens 9R, which thus serve as hologram substrates. The holographic optical element 4 is composed of a composite hologram, and has two patterns of interference fringes composed of interference fringes nonparallel to the hologram substrate surfaces. The diffraction exerted by the patterns of interference fringes permits the holographic optical element 4 to function as an eyepiece lens. Moreover, the wavelength selectivity of the holographic optical element 4 permits it to function as a suitable combiner. That is, while it is possible to satisfactorily observe the two-dimensional image formed on the LCD 3, it is also possible to obtain a sufficient amount of light for the outside world observed through the holographic optical element 4. Moreover, the holographic optical element 4 has an axisymmetric optical power. Giving the holographic optical element 4 an axisymmetric optical power permits observation of an image with aberrations satisfactorily corrected for, and turning the optical path by reflecting it by diffraction, i.e. at an angle of reflection different from that achieved by regular reflection, contributes to miniaturization of the image display apparatus. The example being discussed here deals with a case where the holographic optical element 4 has two patterns of interference fringes, but the holographic optical element 4 may simply have more than one pattern of interference fringes, for example three or more.

Figure 3A:
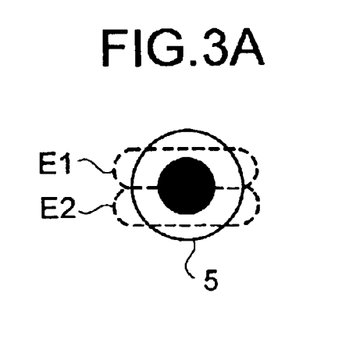
FIGS. 3A and 3B are diagrams illustrating how different patterns of interference fringes form observation pupils.
Figure 3B:
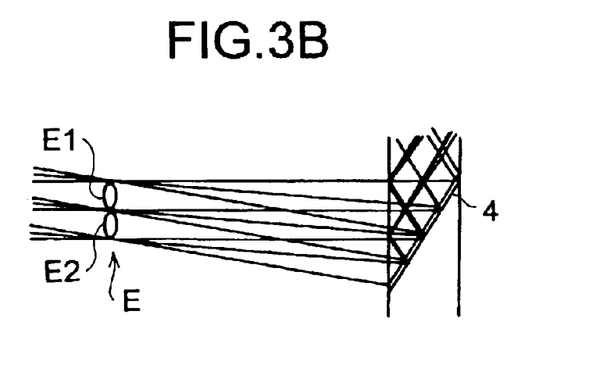

Since the holographic optical element 4 has two patterns of interference fringes, it causes imaging to take place in two ways. That is, the two patterns of interference fringes of the holographic optical element 4 form two observation pupils E1 and E2 as shown in FIGS. 3A an 3B. FIG. 3A shows the positional relationship between the observer's eye 5 and the observation pupils E1 and E2, and FIG. 3B shows the optical path to illustrate how the holographic optical element 4 forms the observation pupils E1 and E2. In this way, the holographic optical element 4 forms, out of the image light having a predetermined wavelength width emanating from the LCD 3, two observation pupils E1 and E2 at spatially different locations. This makes the size of the observation pupils E1 and E2 as a whole larger, and thereby makes the displayed image easier to observe. Moreover, the illumination light emitted by the LED 1 has a wider wavelength width (than laser light), and thus the image light has a predetermined wavelength width. This gives the resulting observation pupils E1 and E2 a suitable size.

Moreover, the holographic optical element 4 acts in such a way that, over the entire area in which the image light is incident thereon, conditions (I) and (II) below are fulfilled for an identical ray.

$$\Delta\theta < 2 \quad (I)$$

$$\Delta\eta > 50 \quad (II)$$

where
$\Delta\theta$ represents the difference (°) in angle of diffraction among the different patterns of interference fringes; and
$\Delta\eta$ represents the difference (%) in diffraction efficiency among the different patterns of interference fringes.

Figure 4:
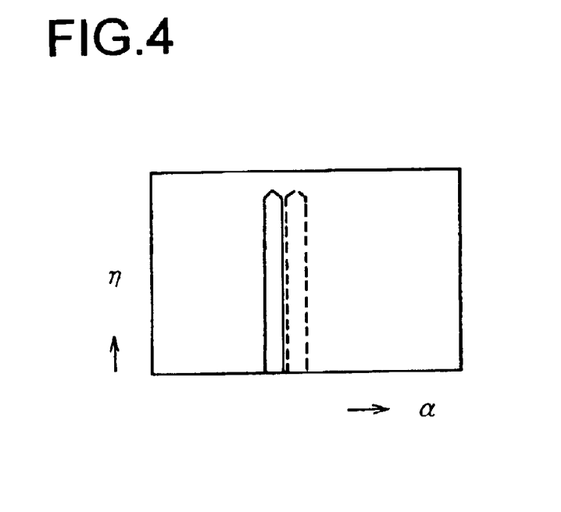
FIG. 4 is a graph showing the angle selectivity of the holographic optical element.

Condition (I) indicates that the two patterns of interference fringes have roughly identical phase functions, and condition (II) indicates that the two patterns of interference fringes have different angle selectivity. Their having different angle selectivity means that, as shown in a graph in FIG. 4 (where $\alpha$ represents the angle of incidence of light and $\eta$ represents diffraction efficiency), there is a difference in the angle of incidence of light at which they exhibit high diffraction efficiency. Thus, the holographic optical element 4, while converting the wavefront with two roughly identical phase functions, exhibits two different patterns of angle selectivity. Accordingly, the two observation pupils E1 and E2 are formed at spatially different locations with roughly equal optical powers.

In the construction described above, when the observer moves his or her eye 5 up or down, the observed image switches between that of one of the two observation pupils E1 and E2 and that of the other. The observer recognizes this switching as a change in the size or position of the observed image the more distinctly the greater the difference in location between the two observation pupils E1 and E2 and the smaller the screen size of the LCD 3. However, since the image produced by an HMD typically has a viewing angle of about 10° to 40°, so long as condition (I) is fulfilled, such a change is quite acceptable and does not unduly degrade the quality of the observed image. On the other hand, with respect to condition (II), how much different the angle selectivity of the two patterns of interference fringes is from each other affects how effectively the observation pupils E1 and E2 can be enlarged. Specifically, if condition (II) is fulfilled, it is possible to effectively enlarge the size of the observation pupils E1 and E2 as a whole and thereby make the displayed image easier to observe. Accordingly, fulfilling conditions (I) and (II) helps enhance the quality of the displayed image and enlarge the observation pupils E1 and E2 to make the displayed image easier to observe.

Examples of the photosensitive material used to fabricate the holographic optical element 4 include photopolymer, silver halide, and bichromated gelatin. Among these materials, photopolymer is particularly preferable, because it permits fabrication by a dry process and thus at low costs, and because it is excellently durable. Moreover, even without the use of silver halide or bichromated gelatin, it is possible, as described above, to enlarge the observation pupils E1 and E2 to make the displayed image easier to observe. The composite hologram constituting the holographic optical element 4 may be a multiple-layer hologram fabricated by laying on each other two holograms each having a pattern of interference fringes recorded thereon or a multiple-exposure hologram fabricated by recording two patterns of interference fringes on a single photosensitive material by multiple exposure. Using a multiple-layer hologram fabricated by laying on one another a plurality of holograms each having a pattern of interference fringes recorded thereon results in height diffraction efficiency. Accordingly, using a multiple-layer hologram as the composite hologram in the holographic optical element 4 helps make the displayed image brighter. On the other hand, a multiple-exposure hologram fabricated by recording a plurality of patterns of interference fringes on a single photosensitive material by multiple exposure requires a smaller amount of the photosensitive material and is easy to fabricate. Accordingly, using a multiple-exposure hologram as the composite hologram in the holographic optical element 4 helps reduce costs.

Figure 5:
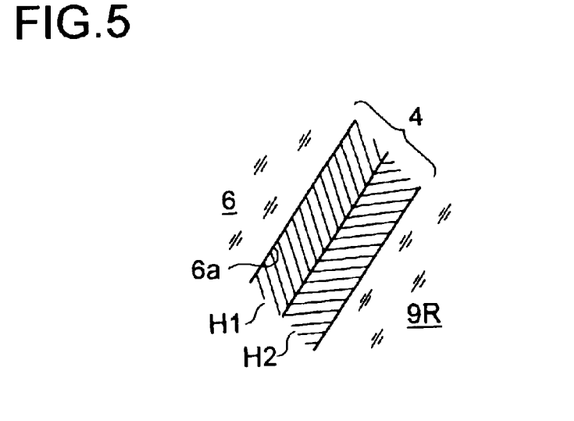
FIG. 5 is an enlarged sectional view showing a portion of a holographic optical element composed of a multiple-layer hologram.
Figure 6:
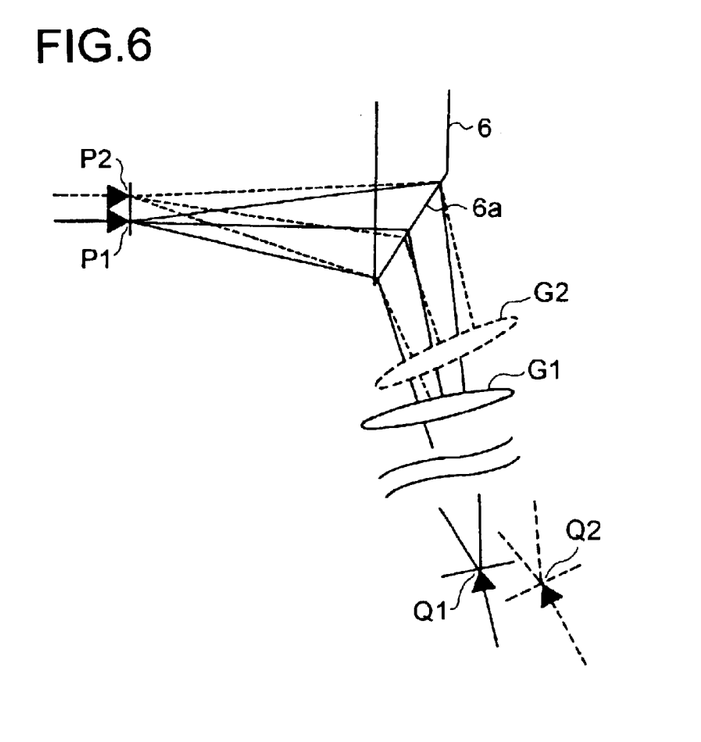
FIG. 6 is an optical construction diagram showing a two-beam hologram exposure apparatus for fabricating a multiple-layer hologram.

Next, a method of fabricating a multiple-layer hologram for use in the holographic optical element 4 will be described. As shown in an enlarged view in FIG. 5, the multiple-layer hologram described here has two holograms H1 and H2 laid on each other, and the two holograms H1 and H2 have identical phase functions, which represent how they convert the wavefront. FIG. 6 shows the optical construction of a two-beam hologram exposure apparatus for fabricating a multiple-layer hologram. Exposure is performed twice, with virtual light source points arranged differently, namely P1 and Q1 as opposed to P2 and Q2, and with different types of exposure optical system, namely G1 as opposed to G2, arranged differently between when exposure is performed for the first and second times. Specifically, the exposure optical systems G1 and G2 used here are so constructed that, even though exposure rays are incident on the photopolymer at different angles of incidence between when exposure is performed for the first and second times, the exposure optical systems G1 and G2 produce patterns of interference fringes having roughly identical phase functions. Since exposure rays are incident at different angles of incidence between when exposure is performed for the first and second times, the holographic optical element 4 so fabricated exhibits two different patterns of angle selectivity (i.e., two maximums in diffraction efficiency) with respect to light of an equal wavelength. The exposure optical systems G1 and G2 are separately constructed to suit the respective sessions of exposure, and are thus easy to design.

A multiple-layer hologram is fabricated in the following manner. First, on the hologram substrate surface 6a of the prism 6, a first photopolymer layer is fixed. By the use of the first exposure optical system G1, a first session of exposure is performed with two beams emanating from two virtual light source points P1 and Q1. As a result, interference fringes are recorded as a pattern of refractive index modulation on the first photopolymer layer. The interference fringes recorded on the first photopolymer layer are, fixed by irradiation with UV (ultraviolet) rays and baking to obtain the first hologram H1. Next, on the first hologram H1, a second photopolymer layer is fixed. By the use of the second, optical system G2, a second session of exposure is performed with two beams emanating from two virtual light source points P2 and Q2. As a result, interference fringes are recorded as a pattern of refractive index modulation on the second photopolymer layer. The interference fringes recorded on the second photopolymer layer are fixed by irradiation with UV rays and baking to obtain the second hologram H2. In this way, the holographic optical. element 4 composed of a multiple-layer hologram is fabricated (FIG. 5). Here, the purpose of performing UV irradiation every time exposure is performed is to irradiate each material with a sufficient amount of UV radiation to perfectly fix the interference fringes. Thus, the fabrication process may be simplified by omitting the UV irradiation and baking after the first session of exposure and performing them only once after the second session of exposure.

Figure 7:
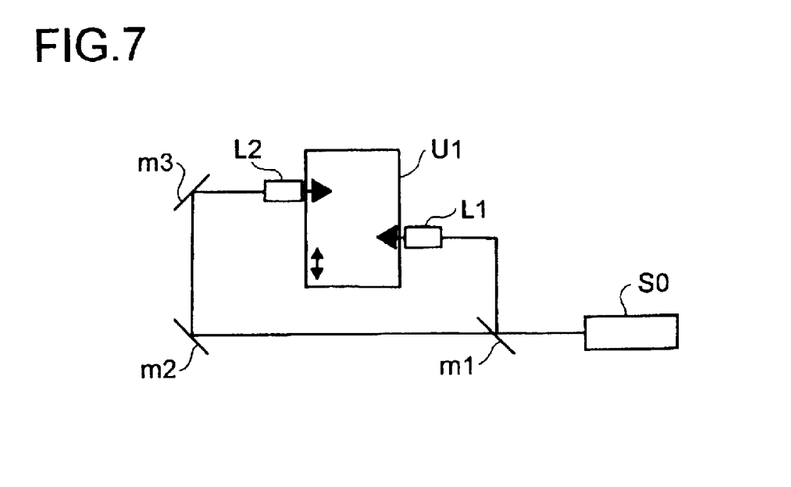
FIG. 7 is a diagram schematically showing an outline of the overall construction of a two-beam hologram exposure apparatus for fabricating a multiple-exposure hologram.
Figure 8:
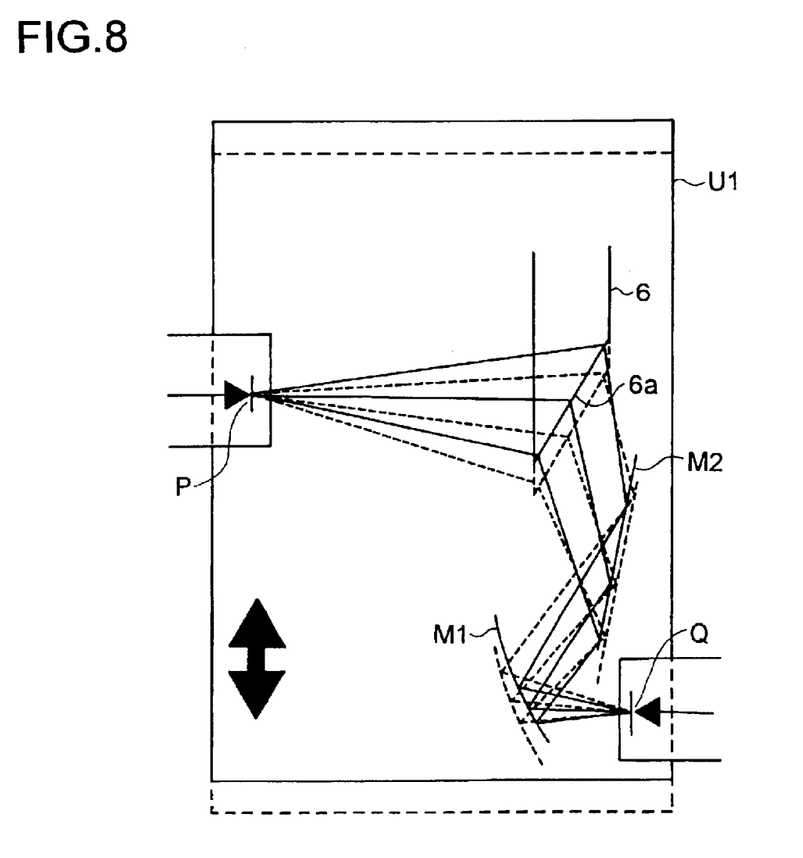
FIG. 8 is a diagram schematically showing the exposure unit included in the two-beam hologram exposure apparatus shown in FIG. 7.
Figure 9:
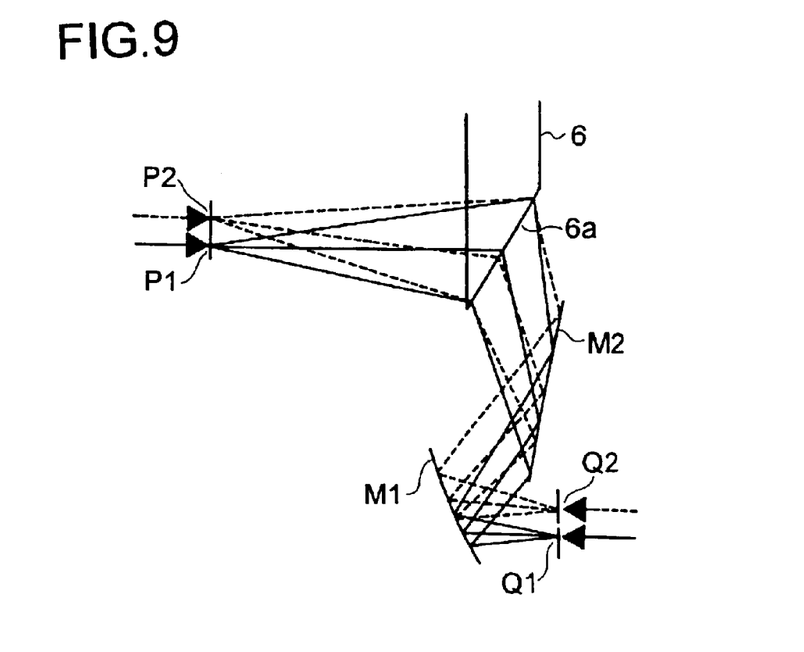
FIG. 9 is a diagram showing the optical construction, as designed, of the two-beam hologram exposure apparatus shown in FIG. 7.

Next, a first method of fabricating a multiple-exposure hologram for use in the holographic optical element 4 will be described. FIG. 7 shows an outline of the overall construction of a two-beam hologram exposure apparatus for fabricating a multiple-exposure hologram. In FIG. 7, reference symbol S0 represents a laser light source, reference symbol ml represents a half mirror, reference symbols m2 and m3 are reflection mirrors, reference symbols L1 and L2 represent objective lenses, and reference numeral U1 represents an exposure unit. FIG. 8 shows the exposure unit U1 constituting part of the exposure apparatus shown in FIG. 7, and FIG. 9 shows the optical construction of the exposure unit U1 ads designed. In FIGS. 8 and 9, reference symbols P, P1, P2, Q, Q1, and Q2 represent virtual light source points, and reference symbols M1 and M2 represent axisynmmetric exposure mirrors.

As shown in FIG. 8, the prism 6 and the exposure mirrors M1 and M2 are fixed to the exposure unit U1 so that, as the exposure unit U1 moves translationally, the prism 6 and the exposure mirrors M1 and M2 move translationally together. The virtual light source points P and Q formed by the objective lenses L1 and L2 are kept at fixed locations, and therefore, as the exposure unit U1 moves translationally, the relative positions of the virtual light source points P and Q with respect to the prism 6 and the exposure mirrors M1 and M2 vary. In FIG. 8, the optical paths indicated with solid and broken lines respectively represent the exposure ray arrangements before and after (i.e. at the times of the first and second sessions of exposure) the prism 6 and the exposure mirrors M1 and M2 actually move relative to the virtual light source points P and Q, which are fixed. On the other hand, in FIG. 9, the optical paths indicated with solid and broken lines respectively represent the exposure ray arrangements before and after (i.e. at the times of the first and second sessions of exposure) the virtual light source points, namely P1 and Q1 as opposed to P2 and Q2, relatively move with respect to the prism 6 and the exposure mirrors M1 and N2, which are regarded as fixed here.

A multiple-exposure hologram is fabricated in the following manner. First, a photopolymer layer is fixed on the hologram substrate surface 6a of the prism 6, and the laser light source S0 shown in FIG. 7 is turned on. The exposure beam emanating from the laser light source S0 is divided by the half mirror ml into two beam, of which one is incident on the objective lens L1 and the other is reflected from the two reflection mirrors m2 and m3 and is then incident on the objective lens L2. The objective lenses L1 and L2 form, as shown in FIG. 8, virtual light source points P and Q, respectively, inside the exposure unit U1. When a first session of exposure is performed with two light beams (solid lines) emanating from the two virtual light source points P and Q with the exposure mirrors M1 and M2 placed at the locations indicated with solid lines, interference fringes are recorded as a pattern of refractive index modulation on the photopolymer layer. Next, the exposure unit U1 is moved to the location indicated with broken lines. When a second session of exposure is performed with two light beams (broken lines) emanating from the two virtual light source points P and Q with the exposure mirrors M1 and M2 placed at the locations indicated with broken lines, interference fringes are recorded as a pattern of refractive index modulation on the photopolymer layer. The energy with which exposure is performed is set by appropriately setting the output power of the laser light source and the duration for which a shutter (not illustrated) is kept open. This applies also to the other embodiments described later. When the patterns of interference fringes recorded on the photopolymer layer are fixed by UV radiation and baking, a composite hologram having two patterns of interference fringes recorded thereon by exposure. i.e. having interference fringe patterns doubly recorded thereon, is obtained. In the composite hologram thus obtained, the pattern of interference fringes recorded in the first session of exposure and the pattern of interference fringes recorded in the second session of exposure have roughly identical phase functions.

Figure 10:
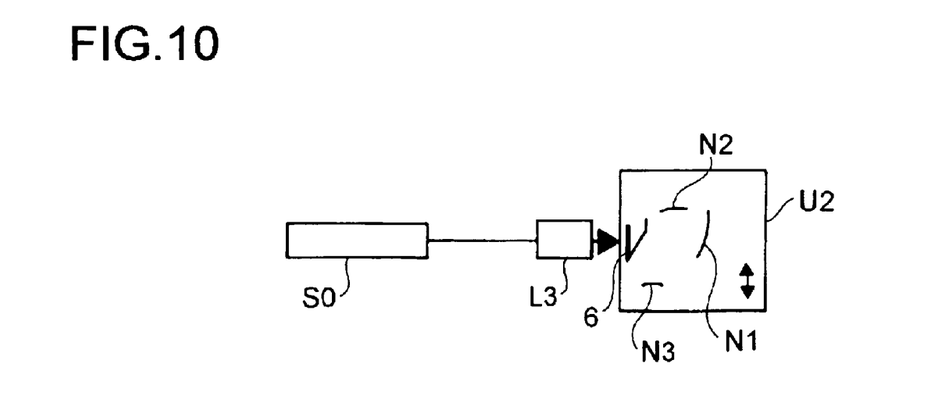
FIG. 10 is a diagram schematically showing an outline of the construction of a single-beam hologram exposure apparatus for fabricating a multiple-exposure hologram.
Figure 11:
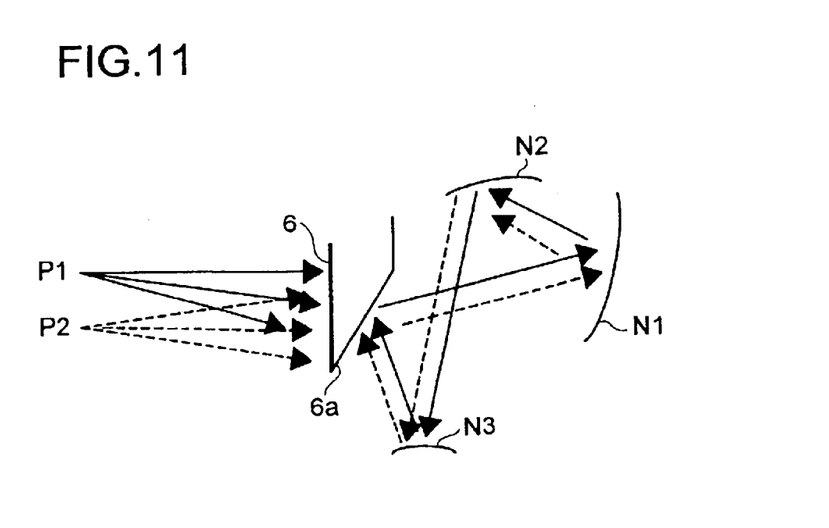
FIG. 11 is a diagram showing the optical construction, as designed, of the single-beam hologram exposure apparatus shown in FIG. 10.

In the above-described method of fabricating a multiple-exposure hologram, the virtual light source points P and Q do not move. This eliminates the need to use more than one exposure optical system including exposure mirrors M1 and M2 and other elements, and thus helps reduce fabrication costs. At the time of designing, as shown in FIG. 9, the two points at which exposure rays are incident are determined as the virtual light source points P1 and P2. Then, the exposure mirrors M1 and M2 are so designed that, for a given ray traveling between those two points, desired imaging performance is obtained at two points corresponding to the virtual light source points Q1 and Q2 and that the imaging magnification is roughly unity. Since the two objective lenses L1 and L2 do not move relatively, the movement of the exposure unit U1 does not affect the imaging performance. Thus, the distance traveled by the exposure unit U1 need not be controlled accurately, and this makes it possible to perform multiple exposure with ease and at low costs Next, a second method of fabricating a multiple-exposure hologram for use in the holographic optical element 4 will be described. FIG. 10 shows an outline of the overall construction of a single-beam hologram exposure apparatus for fabricating a multiple-exposure hologram, and FIG. 11 shows the optical construction thereof as designed. In FIG. 10, reference symbol S0 represents a laser light source, reference symbol L3 represents an objective lens, and reference symbol U2 represents an exposure unit. In FIG. 11 reference. numerals P1 and P2 represent virtual light source points, and reference numerals N1, N2, and N3 represent axisymmetric exposure mirrors. The exposure apparatus shown in FIGS. 10 and 11 is a modified version of the exposure apparatus shown in FIGS. 7 to 9 which adopts single-beam exposure recording. The three exposure mirror N1, N2, and N3 provided in the exposure unit U2 makes single-beam exposure recording possible.

As shown in FIG. 10, the exposure beam emanating from the laser light source S0 is incident on the objective lens L3. The objective lens L3 forms, as shown in; FIG. 11, a virtual light source point P1. The exposure beam (solid lines) emanating from the virtual light source point P1 passes through the prism 6, irradiates the photopolymer layer on the hologram substrate 6a, and is then reflected from the three exposure mirrors N1, N2, and N3 successively in this order. The beam so reflected then irradiates the photopolymer layer on the hologram substrate 6a again. The beam that irradiates the photopolymer layer first and the light that irradiates it from the opposite direction after being reflected from the; exposure. mirrors N1, N2, and N3 form interference fringes, which are recorded as a pattern of refractive index modulation on the photopolymer layer. In this way, the first session of exposure is performed. Next, the exposure unit U2 is moved, and the second session of exposure is performed, in a similar manner to the first session of exposure, with the exposure beam (broken lines) emanating from the virtual light source points P2. Here, as with the first fabrication method, the exposure optical system is so designed that the patterns of interference fringes recorded on the composite hologram by exposure have roughly identical phase functions. When the patterns of interference fringes recorded on the photopolymer layer are fixed by UV irradiation and baking, a composite hologram having two patterns of interference fringes recorded thereon by exposure, i.e. having interference fringe patterns doubly recorded thereon, is obtained. In this exposure apparatus, the exposure optical system has a simple construction, and therefore it is easy to make adjustments when exposure is performed. Moreover it is possible to alleviate the influence of vibration, wind, and other factors that disturb the interference fringes and thereby degrade optical performance.

Figure 12:
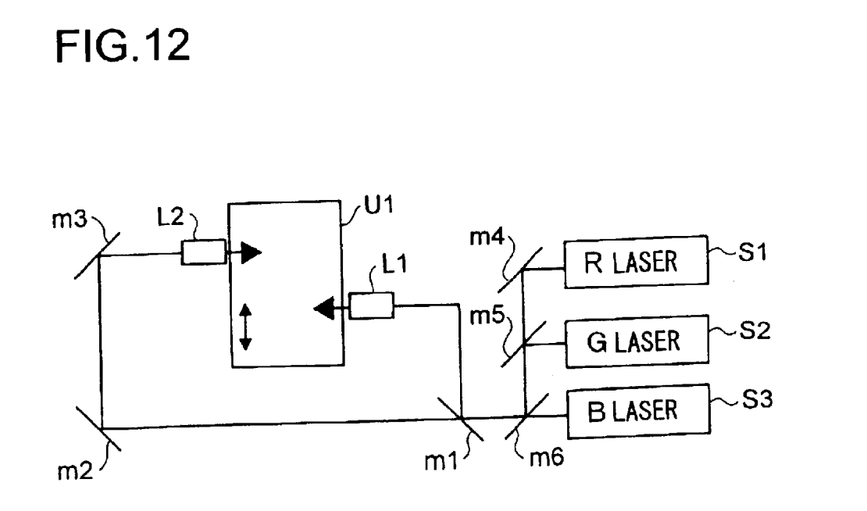
FIG. 12 is a diagram schematically showing an example of how the two-beam hologram exposure apparatus shown in FIG. 7 is modified to cope with colors.

Next, a third method of fabricating a multiple-exposure hologram for use in the holographic optical element 4 will be described. FIG. 12 shows an outline of the overall construction of a two-beam hologram exposure apparatus for fabricating a multiple-exposure color hologram. This exposure apparatus is a modified version of the two-beam hologram exposure apparatus (FIG. 7) describe earlier which is adapted to cope with colors for further enhanced information display. Thus, the exposure apparatus here has the same construction as the two-beam hologram exposure apparatus (FIG. 7) describe earlier except that laser light sources S1, S2, and S3 for three primary colors, i.e., R (red), G (green), and B (blue), are used instead of the laser light sources S0 and that accordingly a reflection mirror m4 and half mirrors m5 and m6 are additionally provided. It is to be noted that full-color image display is achieved by designing illumination and display to cope with three primary colors, i.e., R, G, and B. However, depending on what image to display, it is also possible to design illumination and display to cope with two, or four or more, colors. In any such case, exposure of a hologram is performed separately for each of the plurality of colors that the hologram is designed to cope with.

Figure 13A:
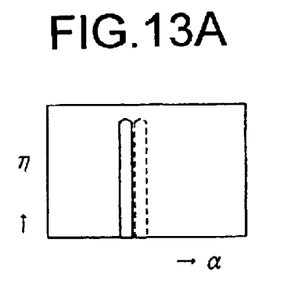
FIGS. 13A and 13B are graphs showing the angle selectivity and wavelength selectivity of the holographic optical element.
Figure 13B:
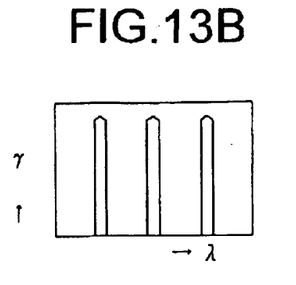

A multiple-exposure hologram is fabricated by performing the first and second sessions of exposure, each separately for each of the colors R, G, and B, by the use of the two-beam hologram exposure apparatus (FIG. 7) described earlier. Specifically, the fabrication process consists of, in order of occurrence, the first session of exposure with an R exposure beam, the first session of exposure with a G exposure beam, the first session of exposure with a B exposure beam, moving the exposure unit U1, the second session of exposure with an R exposure beam, the second session of exposure with a G exposure beam, the second session of exposure with a B exposure beam, UV irradiation, and baking. Exposure may be performed simultaneously for all of the colors R, G, and B. Specifically, the fabrication process then consists of, in order of occurrence, the first session of exposure simultaneous for the colors R, G, and B, moving the exposure unit U1, the second session of exposure simultaneous for the colors R, G, and B, UV irradiation, and baking. FIGS. 13A and 13B show the angle selectivity and wavelength selectivity of the composite hologram thus fabricated. FIG. 13A shows the angle selectivity (where $\alpha$ represents the angle of incidence of light and $\eta$ represents diffraction efficiency), and FIG. 13B shows the wavelength selectivity (where $\lambda$ represents wavelength and $\gamma$ represents the amount of reconstructed light).

As shown in FIG. 13B, the composite hologram obtained in this way has three diffraction wavelength peaks corresponding to the three primary color components R, G, and B. Thus, by using this composite hologram as the holographic optical element 4, and in addition using an LED 1 and an LCD 3 that can cope with three colors R, G, and B, it is possible to realize a full-color image display apparatus. For example, full-color display is achieved by using as an illumination light source three LEDs 1 that individually emit light corresponding to the three primary color components R, G, and B, driving by a field sequential method an LCD 3 that forms images containing color information corresponding to the three primary color components R, G, and B, and making the three LEDs emit light one after another on a time division basis in synchronism with the image signal of those images. When the second session of exposure for a particular color is omitted, the observation pupil E is not enlarged for the image light of that color. This makes it possible to display an image with different sizes of the observation pupil E for different colors.

The embodiments described above include the inventions (i) to (v) having features as noted below, and, with those features, it is possible to realize an inexpensive image display apparatus in the shape of eyeglasses that forms an observation pupil that permits easy observation of the displayed image.

(i) An image display apparatus provided with an image display element for forming a two-dimensional image and an eyepiece optical system including a reflective holographic optical element for projecting the two-dimensional image with enlargement, wherein the holographic optical element is a composite hologram having a plurality of patterns of interference fringes composed of interference fringes nonparallel to a hologram substrate surface, has roughly identical phase functions and different angle selectivity for at least two patterns of interference fringes, and acts in such a way that image light having a predetermined wavelength width emanating from the image display element forms a plurality of observation pupils at spatially different locations.

(ii) An image display apparatus as described in (i) above, wherein the composite hologram is a multiple-layer hologram fabricated by laying on one another a plurality of holograms each having a pattern of interference fringes recorded thereon.

(iii) An image display apparatus as described in (i) above, wherein the composite hologram is a multiple-exposure hologram fabricated by recording a plurality of patterns of interference fringes on a single photosensitive material by multiple exposure.

(iv) An image display apparatus as described in one of (i), (ii), and (iii) above, wherein the holographic optical element has a nonaxisymmetric optical power.

(v) An image display apparatus as described in one of (i), (ii), (iii), and (iv) above, wherein the image display element forms images containing information of a plurality of colors, and the holographic optical element has a plurality of diffraction wavelength peaks corresponding to the different colors.

As described above, in an image display apparatus according to the present invention, a holographic optical element forms a plurality of observation pupils at spatially different locations, and acts in such a way that, over the entire area in which image light is incident, prescribed conditions are fulfilled for an identical incident ray. This makes it possible to form at low cost an observation pupil that permits easy observation of the displayed image. Moreover, by using a multiple-layer hologram as the holographic optical element, it is possible to make the displayed image bright. Alternatively, by using a multiple-exposure hologram as the holographic optical element, it is possible to reduce costs. Moreover, by giving the holographic optical element an axisymmetric optical power, it is possible to observe an image with aberrations satisfactorily corrected for, and to contribute to miniaturization of the image display apparatus. For further enhanced information display, full-color display can be achieved by making an image display element form images containing information of a plurality of colors and giving the holographic optical element a plurality of diffraction wavelenght peaks corresponding to the different colors.

What is claimed is:

1. A holographic element that is a reflective holographic element formed on a substrate and constituted by a composite hologram having a plurality of patterns of interference fringes composed of interference fringes nonparallel to the substrate, the holographic element forming, out of image light having a predetermined wavelength width emanating from an image display element, a plurality of observation pupils at spatially different locations, wherein the holographic element acts in such a way as to fulfill the following conditional formulae (I) and (II) for an identical incident ray over an entire area in which the image light is incident on the holographic element:

$$\Delta\theta < 2 \quad (I)$$
$$\Delta\eta > 50 \quad (II)$$

where $\Delta\theta$ represents the difference (°) in angle of diffraction among the different patterns of interference fringes; and $\Delta\eta$ represents the difference (%) in diffraction efficiency among the different patterns of interference fringes.

2. A holographic element as claimed in claim 1, wherein the composite hologram constituting the holographic element is a multiple-layer hologram fabricated by laying on one another a plurality of holograms each having a pattern of interference fringes recorded thereon.

3. A holographic element as claimed in claim 1, wherein the composite hologram constituting the holographic element is a, multiple-exposure hologram fabricated by recording a plurality of patterns of interference fringes on a single photosensitive material by multiple exposure.

4. A holographic element as claimed in claim 1, wherein the holographic element has a nonaxisymmetric optical power.

5. A holographic element as claimed in claim 1, wherein the holographic element has a plurality of diffraction wavelength peaks.

6. A holographic element as claimed in claim 1, wherein the composite hologram constituting the holographic element is formed by using photopolymer as a photosensitive material.

7. An image display apparatus comprising:

an image display element for displaying a two-dimensional image;

an enlargement optical system for projecting, with enlargement, the image displayed on the image display element; and a holographic element included in the enlargement optical system, the holographic element being a reflective holographic element formed on a substrate and constituted by a composite hologram having a plurality of patterns of interference fringes composed of interference fringes nonparallel to the substrate, the holographic element forming, out of image light having a predetermined wavelength width emanating from the image display element, a plurality of observation pupils at spatially different locations, wherein the holographic element acts in such a way as to fulfill the following conditional formulae (I) and (II) for an identical incident ray over an entire area in which the image light is incident on the holographic element:

$$\Delta\theta < 2 \quad (I)$$
$$\Delta\theta > 50 \quad (II)$$

where $\Delta\theta$ represents the difference (°) in angle of diffraction among the different patterns of interference fringes; and $\Delta\eta$ represents the difference (%) in diffraction efficiency among the different patterns of interference fringes.

8. An image display apparatus as claimed in claim 7, wherein the composite hologram constituting the holographic element is a multiple-layer hologram fabricated by laying on one another a plurality of holograms each having a pattern of interference fringes recorded thereon.

9. An image display apparatus as claimed in claim 7, wherein the composite hologram constituting the holographic element is a multiple-exposure hologram fabricated by recording a plurality of patterns of interference fringes on a single photosensitive material by multiple exposure.

10. An image display apparatus as claimed in claim 7, wherein the holographic element has a nonaxisymmetric optical power.

11. An image display apparatus as claimed in claim 7, wherein the holographic element has a plurality of diffraction wavelength peaks.

12. An image display apparatus as claimed in claim 7, wherein the composite hologram constituting the holographic element is formed by using photopolymer as a photosensitive material.

13. An image display apparatus comprising:

an image display element for displaying a two-dimensional image, an enlargement optical system for reflecting, as a first image, the image displayed on the image display element so as to project, with enlargement, the first image onto an observer's pupil while transmitting, as a second image, an image from an outside world so as to direct the second image to the observer's pupil; and a holographic element included in the enlargement optical system, the holographic element being a reflective holographic element formed on a substrate and constituted by a composite hologram having a plurality of patterns of interference fringes composed of interference fringes nonparallel to the substrate, the holographic element forming, out of image light having a predetermined wavelength width emanating from the image display element, a plurality of observation pupils at spatially different locations, wherein the holographic element acts in such a way as to fulfill the following conditional formulae (I) and (II) for an identical incident ray over an entire area in which the image light is incident on the holographic element:

$$\Delta\theta < 2 \qquad (I)$$

$$\Delta\eta > 50 \qquad (II)$$

where $\Delta\theta$ represents the difference (°) in angle of diffraction among the different patterns of interference fringes; and $\Delta\eta$ represents the difference (%) in diffraction efficiency among the different patterns of interference fringes.

14. An image display apparatus as claimed in claim 13, wherein the composite hologram constituting the holographic element is a multiple-layer hologram fabricated by laying on one another a plurality of holograms each having a pattern of interference fringes recorded thereon.

15. An image display apparatus as claimed in claim 13, wherein the composite hologram constituting the holographic element is a multiple-exposure hologram fabricated by recording a plurality of patterns of interference fringes on a single photosensitive material by multiple exposure.

* * * * *

UNITED STATES PATENT AND TRADEMARK OFFICE
CERTIFICATE OF CORRECTION

PATENT NO.   : 6,771,403 B1
DATED        : August 3, 2004
INVENTOR(S)  : Takeshi Endo et al.

It is certified that error appears in the above-identified patent and that said Letters Patent is hereby corrected as shown below:

Title page,
After "[22] Filed: Apr. 24, 2003", insert -- [65] Prior Publication Data
US 2004/0141217 A1 published July 22, 2004 --.

Column 4,
Line 37, after "LCD", delete ";".

Column 7,
Line 47, delete "ml", and insert -- ml --.
Line 53, delete "ads", and insert -- as --.

Column 8,
Line 16, delete "ml", and insert -- ml --.
Line 65, after "costs", insert -- . --.

Column 9,
Line 18, after "in", delete ";".

Column 11,
Line 43, delete "wavelenght", and insert -- wavelength --.

Column 12,
Line 9, after "a" delete ",".
Line 47, delete "$\Delta\theta > 50$", and insert -- $\Delta\eta > 50$ --.

Signed and Sealed this

Nineteenth Day of April, 2005

JON W. DUDAS
*Director of the United States Patent and Trademark Office*